US008039042B2

(12) United States Patent
Tolt

(10) Patent No.: US 8,039,042 B2
(45) Date of Patent: Oct. 18, 2011

(54) LOW VOLTAGE ELECTRON SOURCE WITH SELF ALIGNED GATE APERTURES, FABRICATION METHOD THEREOF, AND LUMINOUS DISPLAY USING THE ELECTRON SOURCE

(76) Inventor: Zhidan Li Tolt, San Jose, CA (US)

( * ) Notice: Subject to any disclaimer, the term of this patent is extended or adjusted under 35 U.S.C. 154(b) by 785 days.

(21) Appl. No.: 11/927,323

(22) Filed: Oct. 29, 2007

(65) Prior Publication Data

US 2008/0261337 A1  Oct. 23, 2008

Related U.S. Application Data

(62) Division of application No. 10/707,342, filed on Dec. 5, 2003, now Pat. No. 7,459,839.

(51) Int. Cl.
*B05D 5/12* (2006.01)
*B44C 1/22* (2006.01)
(52) U.S. Cl. .......... 427/77; 427/271; 427/282; 427/558; 216/48
(58) Field of Classification Search .................... 427/77, 427/271, 282, 558; 216/38, 48, 52
See application file for complete search history.

(56) References Cited

U.S. PATENT DOCUMENTS

| 5,973,444 | A  | * | 10/1999 | Xu et al. ........................ 313/309 |
| 6,062,931 | A  | * | 5/2000  | Chuang et al. ................... 445/24 |
| 6,283,812 | B1 | * | 9/2001  | Jin et al. ............................ 445/24 |
| 6,628,053 | B1 | * | 9/2003  | Den et al. ........................ 313/310 |
| 6,650,061 | B1 | * | 11/2003 | Urayama et al. ............ 315/169.3 |
| 6,741,019 | B1 | * | 5/2004  | Filas et al. ...................... 313/355 |
| 6,831,017 | B1 | * | 12/2004 | Li et al. ........................... 438/694 |
| 2002/0175323 | A1 | * | 11/2002 | Guillom et al. ................. 257/10 |
| 2003/0207505 | A1 | * | 11/2003 | Theiss et al. ................... 438/158 |
| 2004/0005723 | A1 | * | 1/2004  | Empedocles et al. ............. 438/1 |

* cited by examiner

*Primary Examiner* — James Lin

(57) ABSTRACT

A method of fabricating an electron source having a self-aligned gate aperture is disclosed. A substrate is deposited on a first conductive layer. Over the first conductive layer an emitter layer is deposited. The emitter layer includes one or a plurality of spaced-apart nano-structures and a solid surface with nano-structures protruding above the surface. An insulator is conformally deposited over the emitter layer surface and forms a post from each protruding nano-structure. A second conductive layer is deposited over the insulator and the second conductive layer and the insulator are removed from the nano-structures such that apertures are formed in the second conductive layer and at least the ends of the nano-structures are exposed at the centers of said apertures.

26 Claims, 9 Drawing Sheets

LOW VOLTAGE ELECTRON SOURCE WITH SELF ALIGNED GATE APERTURES, FABRICATION METHOD THEREOF, AND LUMINOUS DISPLAY USING THE ELECTRON SOURCE

CROSS-REFERENCE TO RELATED APPLICATIONS

This application is a divisional of U.S. application Ser. No. 10/707,342, filed on Dec. 5, 2003, published on Jun. 16, 2005, as U.S. 2005/0127351 A1, and titled "LOW VOLTAGE ELECTRON SOURCE WITH SELF ALIGNED GATE APERTURES, FABRICATION METHOD THEREOF, AND LUMINOUS DISPLAY USING THE ELECTRON SOURCE." This application is related to U.S. application Ser. No. 10/807,890, filed on Mar. 24, 2004, U.S. application Ser. No. 11/467,880 filed on Aug. 28, 2006 and U.S. application Ser. No. 11/467,876 filed on Aug. 28, 2006.

FIELD OF THE INVENTION

The present invention relates to an emission electron source using nano-structures as emitters and self-aligned and nano-sized gate aperture for low voltage control, the fabrication method thereof and its use in flat panel display.

DESCRIPTION OF THE RELATED ART

There has been broad interest in the field emission application of nano-structured materials because of their inherited high aspect ratio. Among various materials, Carbon nanotube (CNT) appears the most promising. Numerous studies have reported the advantageous emission properties of CNT. It has a threshold field as low as 1 to $2\times10^6$ V/m, a low electron energy spread, and can carry a current as high as 500 nA (nano-Amperes) per tube. Its extraordinary high electrical and thermal conductivity as well as strong chemical and mechanical stability make it an ideal field emitter.

Potential applications of a CNT field emission device include flat panel displays, 2D sensors, direct writing e-beam lithography, microwave amplifiers, x-ray generator, electron microscopy, as well as various other instrumentations. However, all of these applications demand the device to meet part or all of the following requirements: 1) ability to modulate electron emission at a low voltage, ideally, less than 10V; 2) high emission current density; 3) high emission uniformity over large area; 4) high energy efficiency; 5) resistance to ion bombardment; 6) chemical and mechanical robustness; 7) generation of collimated electron beam. The importance of the ability to modulate a source at low voltage can hardly be over stressed. The cost of a device driver, which often is a major cost component, power consumption, as well as device miniaturization are all depend on the modulation voltage. To achieve low voltage emission modulation, a gate electrode has to be fabricated in the vicinity of the emitter to control the emission. To modulate emission at a voltage less than 10 V, this distance has to be close to one micrometer or less. High emission current density and high emission uniformity requires a high emission site density and high emission homogeneity between the sites. For display applications, for example, a minimum emission site density of $10^6/cm^2$ (equivalent to 25 emitters in a 50 μm×50 μm pixel) is required. High energy-efficiency requires both a low gate current and a low modulation voltage. For a field emission device of a meaningful lifetime and stable electron emission, the emitter material as well as device structure have to be chosen in order that the emitter is able to sustain ion bombardment and chemical erosion from active species in the device operating environment.

Despite the superior emission properties of a single CNT, the current state of the art of a CNT electron source does not meet most of the above requirements and, therefore, has not found any product applications yet, despite the appearance of some prototype flat panel displays. The major challenges and problems include:

a) Insufficient Growth Control in CNT Length, Diameter and Spacing Between Them

CNT tends to grow in a wide range of length on the same sample even in a small proximity. As a result, each CNT will have a different aspect ratio and a different distance from the gate electrode, should an integrated gate electrode be built. Those CNTs with a higher aspect ratio and proximity closer to the gate will experience a stronger extraction field and, therefore, emit electrons first and with a higher current density, and in the end, burn out faster. CNT growth requires a catalyst. The diameter and spacing between CNTs is determined by the catalyst size and spacing. With a continuous layer of catalyst, or gas phase catalytic doping, CNT grow densely, causing electrostatic screening effect between neighboring CNTs. The result is an array of highly oriented and densely packed CNT, which will hardly emit electrons. The diameter of the CNT is also random, again causing variation in aspect ratio. In prior art, the spacing between CNTs is controlled by patterning catalyst into array of dots before the CNT growth using either e-beam lithography or a mono-layer of nano polymer beads as a mask for the catalyst deposition. Both methods are difficult to implement in production. E-beam lithography is so slow and expensive that it is ill suited for any meaningful operation. Applying a mono-layer consistently over large an area is no easy task.

b) Difficulty in Fabrication of an Integrated Gate Structure

Two obstacles make the fabrication difficult. First, CNT films is sensitive to wet processes. Upon exposure to a wet agent, CNTs either stick to the substrate or to themselves, diminishing their field emission properties. Second, the gate aperture has to be aligned with CNT.

In one of prior art, shown in FIG. 1A, the gate electrode is replaced by a metallic grid mechanically mounted atop of a randomly grown CNT film. Emission modulation using such a grid typically requires a voltage on the order of 1 kV.

In another prior art, shown in FIG. 1B, a gate structure is pre-fabricated using either conventional micro-fabrication or thick film technology. CNTs are then either grown into the gate hole without further processing or screen printed into the gate holes respectively. The problem is that a group of densely grown CNTs in a single gate hole does not emit well because of the strong electrostatic effect amongst them and the variation in their length and aspect ratio. CNTs mixed with other chemicals to facilitate screen-printing into gate hole do not perform well either. In addition, deposition of CNT into the gate hole often cause short circuit between the gate and the cathode electrode, resulting in low production yield.

In a third prior art, shown in FIG. 1C, vertically oriented and mono-dispersed CNT is grown before gate fabrication and the gate aperture is self-aligned with a diameter of at least 2 micrometers. The spacing between CNTs has to be controlled to at least 5 micrometers so that there will be only one CNT in each gate hole. To achieve such a growth, e-beam lithography was used to pattern the catalyst into an array of dots with desirable spacing and dot size, even though the fabrication of a self-aligned gate aperture does not require lithography.

c) High Modulation Voltage

The diameter of a typical gate aperture fabricated by prior art is typically a few micrometers, while the one fabricated by thick film process can have diameters on the order of tens of micrometers. Therefore, emission modulation voltage for these integrally gated source will be tens to hundreds of volts. For display application, these high modulation voltages are impractical, since conventional CMOS display drivers will not be able to deliver it.

d) Low Emission Site Density

The best performing field emission films today are those randomly grown CNT without exposing further processing. Typically, they have an emission site density on the order of $5\times10^5/cm^2$. For an integrally gated structure, where CNTs are grown or printed in a pre-made gate aperture, there exist large variations among the CNTs, both within the same gate hole as well as from gate hole to gate hole. These variations both in length (thus tip-to-gate distance) and aspect ratio will cause emission to be dominated by those few emitters that experience the highest local electrical field. The diameter of the each gate aperture, which is at best a few micrometers, also puts a limit on the emission site density.

e) Inhomogeneous Emission

The variation in length, diameter and spacing between CNTs discussed above will cause some emitters emit electrons easier. In a display, these dominating sites appear as bright spots on the phosphor screen. And due to higher current, these sites also burn out faster and, therefore, have a short lifetime.

f) Relatively Low Resistance to Ion Bombardment and Erosion from Residual Oxygen Oxygen is one of the major residual gases in most field emission devices. Carbon reacts easily with oxygen, causing emitter erosion. Carbon is also relatively easy to be sputtered by ion bombardment. Accumulated re-deposition of the sputtered Carbon can then causes short circuit between electrodes.

g) Highly Divergent Electron Beam

Since CNT tips tend to point to random direction, the generated electron beam is highly divergent.

h) Low Production Yield

Both growth and screen-printing of CNT into a pre-fabricated gate holes can often cause short circuit between cathode and gate electrodes. The strict requirements of high-resolution photolithography also contribute to lower production yield and high cost.

BRIEF SUMMARY OF THE INVENTION

It is the objective of the current invention to: a) provide a method to fabricate a self-aligned gate aperture with a diameter on the order of 100 nanometer around each vertically oriented CNT and with equal distance to each CNT; b) provide a method for controlling CNT growth over large area so that they are mono-dispersed, with a narrow distribution in diameter, and, furthermore, the spacing between them is large enough to enable a gate aperture around each CNT and yet small enough in order that the emitter density can be as high as $10^8/cm^2$; and c) provide a means for enabling favorable wide band gap semiconductor nano-structures to be utilized as field emitters.

It is another object of the invention to provide an electron source using a vertically oriented and mono-dispersed nano-structures that: a) has emission properties which can be modulated with a low voltage, b) has a high emission site density, c) emits uniformly over large area, d) generate a highly collimated electron beam, e) has high energy efficiency, f) is robust to ion bombardment and chemical attack, and g) is easy to fabricate with high production yield.

It is the third objective of the invention to provide a display using the above electron source.

To achieve the first objective, one or array of vertically oriented CNT of an average length of one or a few micrometer is grown or assembled onto a first conductive layer (cathode electrode) extending over a substrate. A dielectric is then deposited to completely or mostly embed the CNT. Chemical mechanical planarization (CMP) is then performed to truncate the CNT, equalizing the length of each CNT in the array. An etch-back of the embedding dielectric is further applied to allow the CNTs to protrude above the surface. The length of the protruding portion of the CNT is substantially less than one micrometer and is preferably less than 200 nm. A second conformal insulator layer is then deposited with a thickness about 100 nm or less, such that one or array of posts forms from the protruding CNT. A second conductive layer for a gate electrode is further deposited over the insulator. The gate metal and the second insulator are then removed by several methods, as is explained in details in the later section of the disclosure, from the nano-structures, leaving a self-aligned aperture in the gate electrode and the insulator around each CNT. Each gate aperture is spaced from the exposed CNT by a distance equal to the thickness of the insulator.

Self-alignment of an aperture on the order of 100 nm in diameter, as is described in the current invention, means the location where the vertically oriented CNT is grown or assembled can be random and needs not be predetermined. The spacing between CNTs, in this invention, may be as low as one micrometer or less. Therefore, two orders of magnitude higher emitter density over prior art is possible and advantages can be taken of CNT growth or assembly controlling processes that don't require expensive and complicated lithography.

One of such enabled embodiments is to use an ion-track-etched membrane as a hard mask for patterning catalyst before CNT growth. Preferred membranes are those with a pore density about $1\times10^8$ pores/cm² and pore sizes from 20 to 150 nm. It is known that for CNT growth, its diameter and the inter-tube spacing are determined by those of catalyst, provided the catalyst size is less than 200 nm. Catalyst deposition through an ion-track-etched membrane with chosen pore size and density will produce an array of catalyst dots with substantially uniform size and desirable inter-tube spacing.

The advantages of using the ion-track-etched membranes as a shadow mask for catalyst deposition include: a) pore size and density are in the most desirable range and are highly controlled, b) inexpensive, widely available, and come in sizes particularly suitable for large flat panel display applications, and c) it is easy to apply them to a substrate surface as a shadow mask and they can be recycled in production, provided the catalyst is removed after each deposition.

Throughout the discussion above, CNT is used as the emitter. However, according to the current invention, the emitter does not have to be CNT. Any conductive nano-structure with high melting pointing and high mechanical and chemical stability can directly replace the CNT. Furthermore, nano-structures of non-conductive materials, particular those of wide band gap semiconductor, such as BN nanotube, and nanowires of AlN, AlGaN, SiC, and GaN can be utilized. Wide band gap semiconductor materials have the most desirable electronic, chemical, mechanical and thermal properties for field emitter, except that they are not conductive. According to the current invention, the problem can be solved by conformally coating these nano-structures with a thin layer of conductive material before the deposition of the embedding dielectric. Or, a conductive material can be used for the entire embedding material. The conductive coating on the non-conductive nano-structure, or the conductive embedding material, will serve to transport electrons from the cathode to or near the tip of the nano-structure.

The completed structure, as is described above, forms an electron source. It comprises of: a first cathode electrode disposed over a substrate, the cathode electrode for providing a source of electrons; an emitter layer being deposed over the cathode electrode and formed from a composition of a embedding material and one or an array of vertically oriented and mono-dispersed nano-structures embedded therein, the emitter layer having a surface parallel to which the nano-structures are truncated to the same length, and above the surface the nano-structures protrude by a small fraction of one micrometer; a gate insulator of a thickness on the order of 100 nm being disposed over the emitter layer and having one or array of apertures aligned with and exposes each nano-structure in the emitter layer; and a gate electrode deposed over the gate insulator and having apertures aligned with each of those in the insulator and spaced from the exposed nano-structure by a distance equal to the thickness of the insulator, the gate electrode for controlling the emission of electrons through the apertures from the exposed nano-structures.

The electron source as is described above become addressable when: the first cathode electrode is configured as multiple cathode electrodes each electrically isolated from each other; the gate electrode is configured as multiple gate electrodes, each electrically isolated from each other and intersects with the multiple cathode electrodes; and apertures are formed in the gate electrode and the insulator, each exposes and is aligned with one nano-structure from the emitter layer. Activation of a selected cathode and a selected gate electrode will determine one intersection that emits electrons.

In accordance with the current invention, the gate aperture will always be perfectly aligned with the emitter, and the distance between aperture and its emitter will be substantially the same over the entire substrate surface, on the order of 100 nm, and controllable by the thickness of the gate insulator. And, all the emitters have substantially the same length and diameter. A gated field emission electron source with these characteristics provides an extra low voltage modulation, uniform emission over large area, and low energy loss from gate current. Since the emitter is largely embedded in a dielectric, it is mechanically and chemically protected and, to some extent, shielded from ion bombardment, giving rise to a longer lifetime and steadier electron emission. With a proper selection, the embedding material can also enhance the thermal conduction from the emitter. When a dielectric is used as the embedding material, the relatively large gap between the cathode and the gate electrodes also reduces the occurrence of a short circuit between them and the capacitive energy consumption during the emission modulation, resulting in a higher production yield and higher energy efficiency. An array of emitters with a density as high as $10^8/cm^2$ will produce a more homogeneous emission compared to those of low emitter density.

A display or a lighting device is formed, when the electron source is positioned opposed to and with a vacuum gap from a third anode electrode on which a phosphor screen is deposited. Electrons generated from the emitter by an applied voltage between the cathode and gate electrodes are made incident on the phosphor screen by another positive voltage applied to the anode electrode. Light is generated when the electrons strike the phosphor screen. When a transparent anode electrode is used and it is deposited on a transparent glass substrate, the generated light becomes visible from outside of the device.

The display device described above become fully addressable, when: the cathode electrode is configured as array of strip-like cathode electrodes extending substantially in the same direction and to be spaced and electrically insulated from each other at intervals in the transverse direction; the gate electrode is configured as array of strip-like gate electrodes extending in the direction that intersect with the cathode electrodes and to be spaced and electrically insulated from each other at intervals in the transverse direction; one or an array of apertures are formed in the gate electrode and the gate insulator at intersections, each aligned with and exposes one nano-structure in the emitter layer; and the anode electrode is configured as an array of strip-like anode electrodes, each extending opposed to a corresponding gate electrodes. The intersection forms a pixel region corresponding to one pixel of a display.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1A shows a grid gated electron source using carbon thin film or CNT as emitter;

FIG. 1B shows an integrally gated emission electron source with multiple CNT in one aperture; and FIG. 1C shows an integrally gated field emitter with one vertically oriented CNT in each aperture and an aperture diameter larger than 2 micrometers;

FIG. 2A shows a section view from the front;

FIG. 2B shows the top view;

FIG. 3A shows a substrate;

FIG. 3B shows the deposition of cathode electrode on the substrate;

FIG. 3C shows the deposition and patterning of catalyst on the cathode;

FIG. 3D shows the growth of a vertically oriented CNT from each catalyst dot;

FIG. 3E shows the deposition of a conformal embedding dielectric over the CNT;

FIG. 3F shows the truncation of CNT by polishing;

FIG. 3G shows the formation of an emitter layer by a slight etch back of the embedding dielectric after CNT truncation;

FIG. 3H shows the conformal deposition of a gate insulator, and a line-of-sight deposition of a metal layer for the gate electrode;

FIG. 3I shows the formation of self-aligned gate aperture around each CNT after the removal of the gate insulator and the gate metal from the protruding CNT.

FIG. 4A shows the section view after the deposition of a second dielectric and the gate electrode;

FIG. 4B shows the formation of the self-aligned gate aperture around each CNT after CMP and a slight etch back.

FIG. 5A illustrates how to form a self-aligned photo resist mask after the deposition of a second dielectric and the gate electrode;

FIG. 5B shows the top view after the formation of a self-aligned resist mask;

FIG. 5C shows the formation of self-aligned gate aperture around each CNT by using self-aligned resist mask to remove the gate metal and insulator on CNT.

Reference designators used herein are: 20 CNT, 22—non-conductive nano-structure, 24 conductive coating on a non-conductive nano-structure, 30 the first electrode, 32 the second electrode, 34 gate aperture, 36 gate insulator, 40 substrate, 42 anode with phosphor screen, 50 catalyst, 52 an embedding dielectric material, 56 post, 58—photo resist, 60 UV illumination, 70 vacuum space between electron source and anode, 100 emitter layer, 200 electron source, 300 addressable electron source, 400 anode plate, 500 display.

DETAILED DESCRIPTION OF THE INVENTION

Figure 1A:
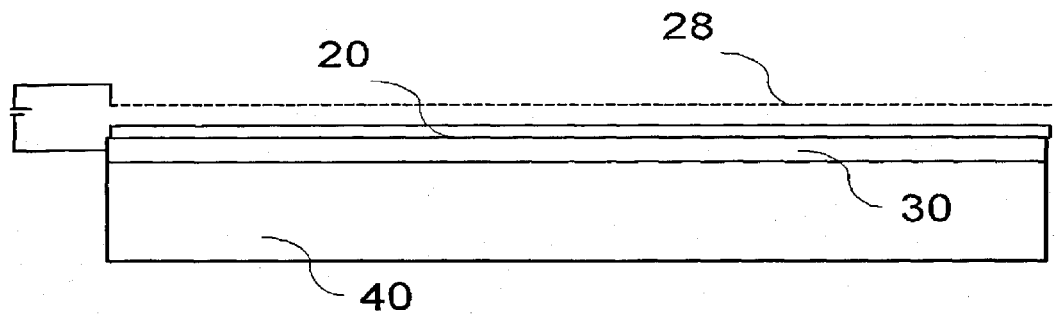
FIG. 1A through FIG. 1C are schematic illustrations of various prior electron source configurations.
Figure 1B:
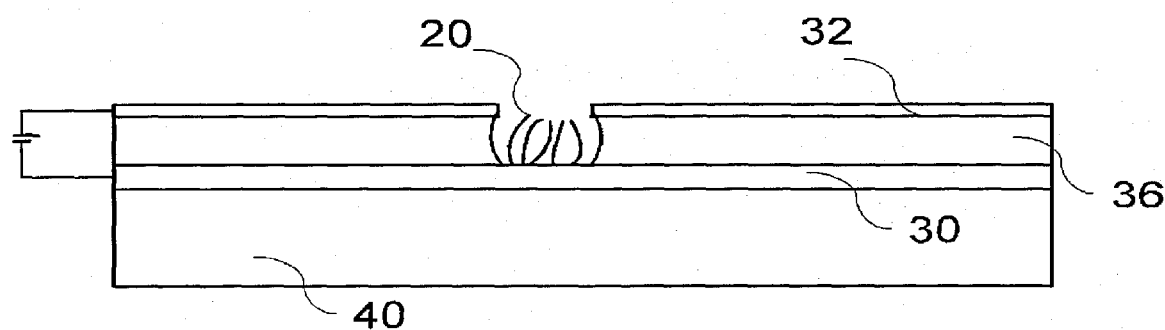
Figure 1C:
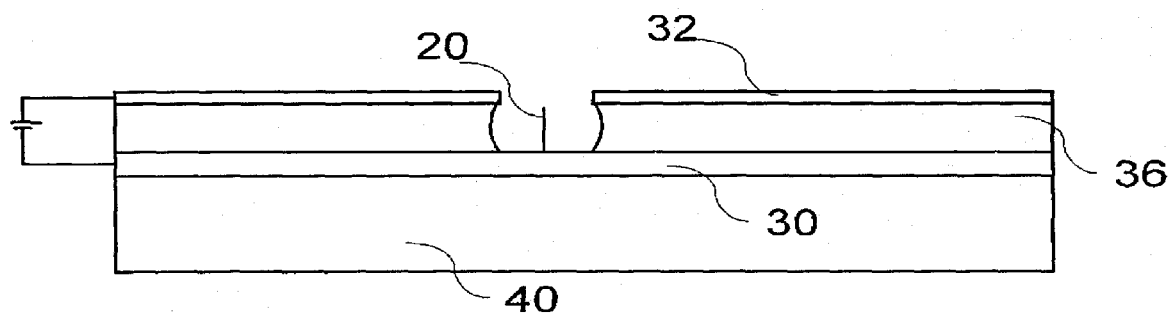
Figure 2:
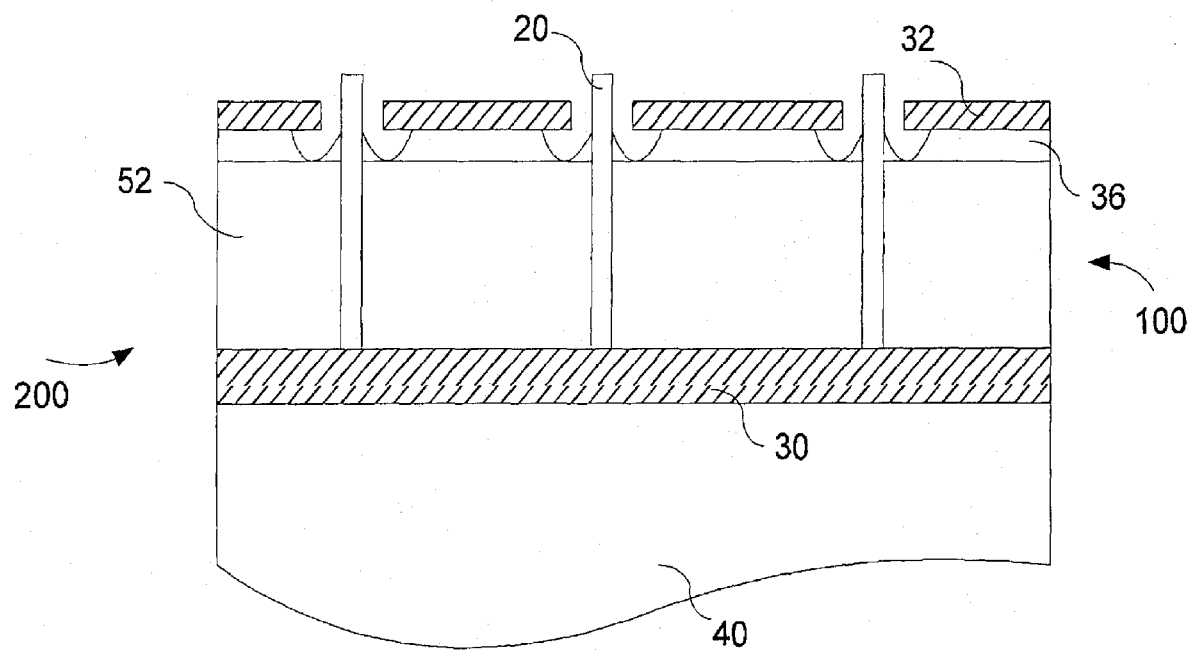
FIG. 2A-FIG. 2B show an electron source according to current invention.
Figure 2:
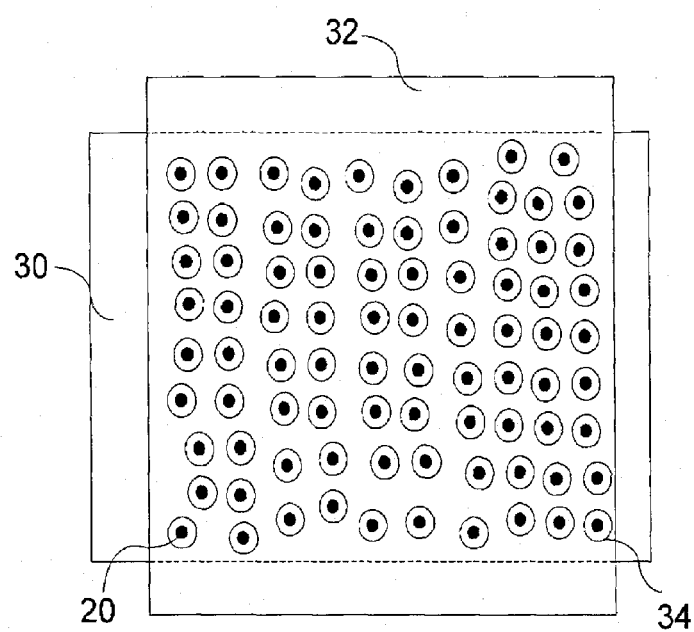

FIG. 2 illustrates an electron source 200 by current invention using vertically aligned and mono-dispersed CNT 20 as emitter. It includes a cathode electrode 30 deposited on a substrate 40; an emitter layer 100 disposed over the cathode and formed from an embedding dielectric 52 and an array of CNTs embedded therein, the emitter layer having a surface parallel to which the CNTs have been truncated to the same length, and above the surface the CNTs protrude by a small fraction of one micrometer; a gate insulator 36 disposed over the emitter layer of a thickness on the order of 100 nm and having an array of apertures, each aligned with and exposes one nano-structure in the emitter layer; and a gate electrode 32 deposited on the gate insulator and having an array of apertures 34 aligned with the apertures in the insulator and spaced from the exposed CNT by approximately the thickness of the insulator. When a positive voltage is applied between the gate and the cathode electrodes, the gate apertures extract electrons from the CNTs.

Figure 3:
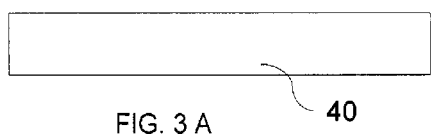
FIG. 3A through FIG. 3I illustrate the fabrication steps of the first embodiment of the current invention.
Figure 3:
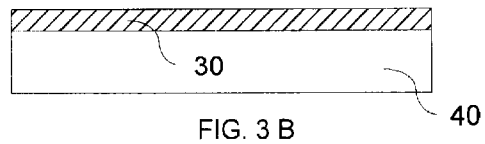
Figure 3:
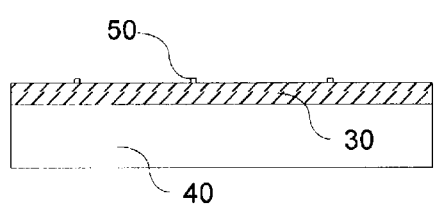
Figure 3:
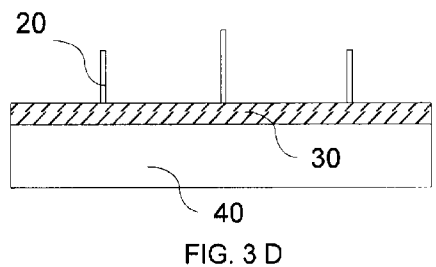
Figure 3:
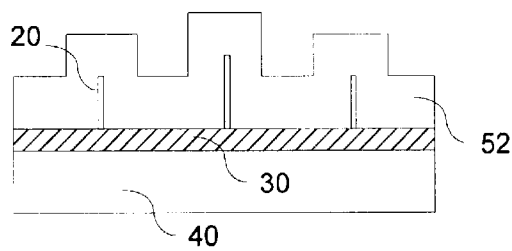
Figure 3:
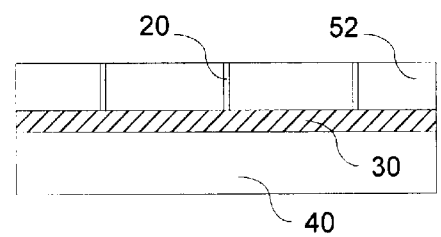
Figure 3:
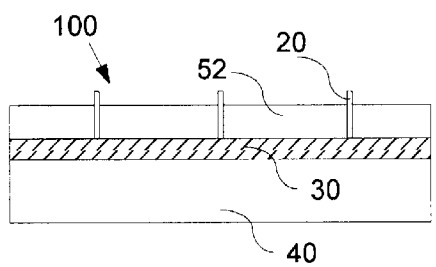
Figure 3:
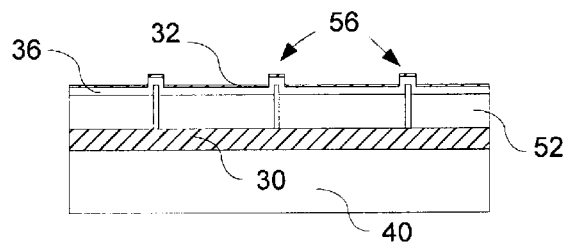
Figure 3:
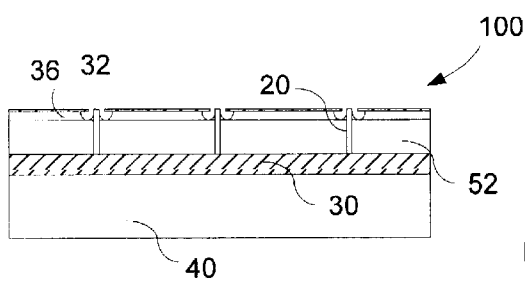

FIG. 3 depicts one of the possible fabrication process flows for the source shown in FIG. 2. Starting with an insulating substrate 40, such as a Si wafer or a glass plate, shown in FIG. 3A, a cathode metal 30, Cr for example, is deposited on to the substrate, as is shown in FIG. 3B. A patterned catalyst layer 50 of 3 nm thick is then deposited onto the cathode, as shown in FIG. 3C. The catalyst, Ni for example, can be deposited by thermal or e-beam evaporation, or electrochemical plating through an ion-track-etched membrane laid on top of the substrate. After the deposition, the Ni forms an array of dots on the cathode metal of a diameter and a surface density of 30 nm and $10^8/cm^2$ respectively, for instance. Vertically aligned CNT 20 is then grown by one of the known techniques, such as plasma enhanced chemical vapor deposition (PECVD), with one CNT grown from one catalyst dot, as is shown in FIG. 3D. Since the diameter of the catalyst dots has a narrow distribution, the grown CNTs in the array are expected to have a consistent diameter. A dielectric 52, Silicon Oxide $SiO_2$, for example, is then conformally deposited until it completely or almost completely embeds the CNT, shown in FIG. 3E. A chemical mechanical planarization (CMP) process is then applied to the surface to truncate all the CNT to the same length and obtain a flat surface, shown in FIG. 3F. A slight etch back of the embedding oxide is then performed so that ends of the truncated CNTs protrude from the surface for about 150 nm, forming an emitter layer 100, as is shown in FIG. 3G. A conformal coating of a gate insulator 36, such as $SiO_2$ again, is then applied to the surface with a thickness on the order of 100 nm, 75 nm for example, forming an array of posts 56 from the CNT. A line-of-sight deposition of a gate metal 32 of a thickness less than that of the gate insulator, 35 nm for example, is then followed for the gate electrode. As is shown in FIG. 3H, the line-of-sight deposition by, for example, e-beam evaporation will deposit the gate metal only on the top of the posts and the floor surface at the bottom of the post. An insulator etch is then performed to remove the coating on the CNTs and, at the same time, lift off the gate metal on the post, leaving a gate aperture 34 and a corresponding insulator aperture around each CNT, as is shown in FIG. 3I. As a result, an electron source with a perfectly aligned gate aperture, a gate to emitter distance less than 100 nm and an emitter density of $10^8/cm^2$ is completed without using any expensive and complicated lithography processes. Here $SiO_2$ has been used for both the embedding dielectric and the gate insulator. However, a second dielectric material different from that of the embedding dielectric can also be used for the gate insulator.

Figure 4:
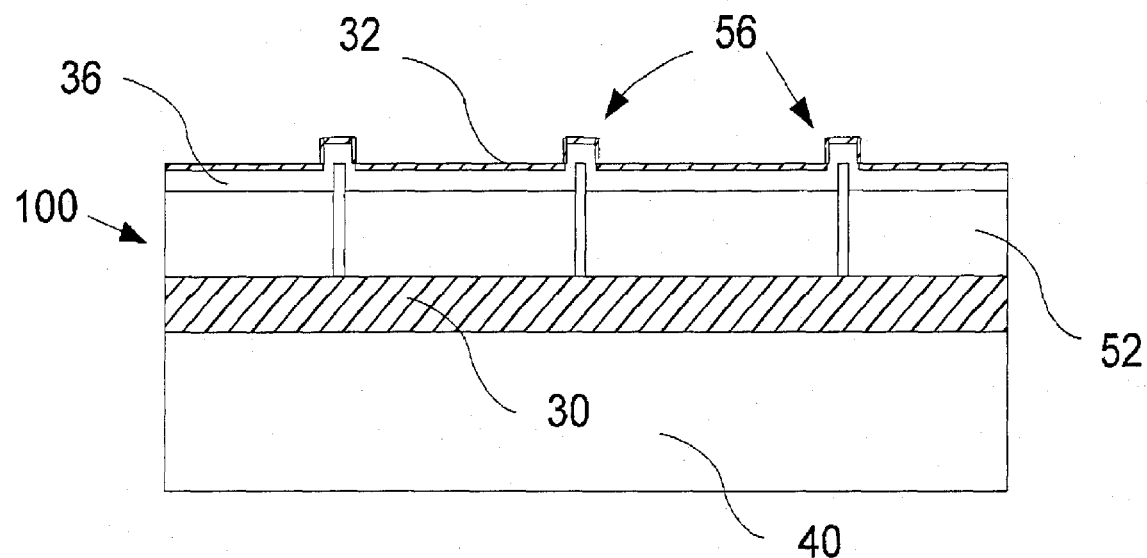
FIG. 4A and FIG. 4B show the formation of self aligned gate aperture by CMP.
Figure 4:
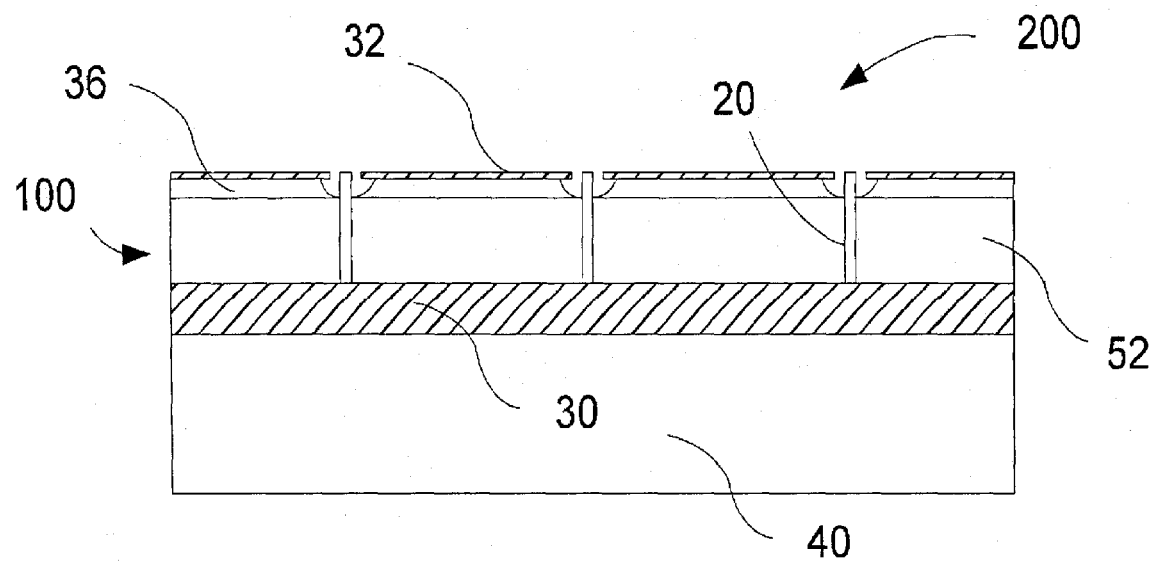

FIG. 4 shows an alternative way of fabricating the self-aligned gate aperture in accordance with the current invention. Repeating the steps described above until the deposition of the gate metal as is shown in FIG. 4A. Here the gate metal does not have to be thinner than the conformal insulator layer and it does not have to be deposited by a line-of-sight process either. When a CMP is then applied to remove the posts 56 and stop at the gate metal on the floor surface, an aligned gate aperture around each of the CNTs automatically forms. A slight etch back of the gate insulator is then applied, forming aligned apertures in the insulator to further expose the protruding portion of the CNTs in the emitter layer for emitting electrons, as is shown in FIG. 4B.

Figure 5:
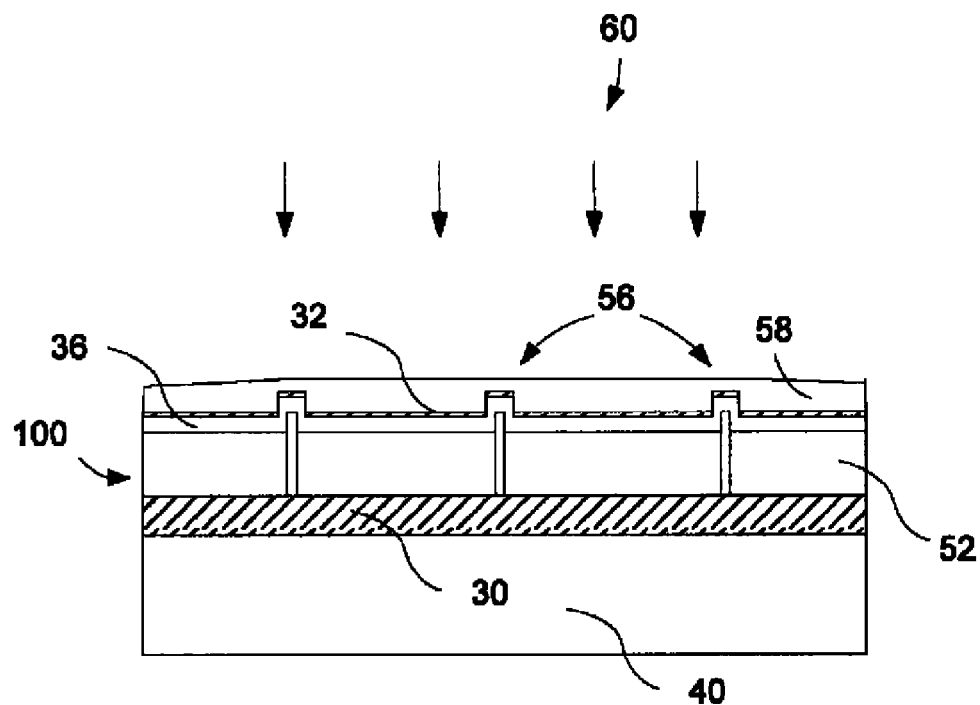
FIG. 5A through FIG. 5C show the formation of self aligned apertures by using photo resist as a etch mask.
Figure 5:
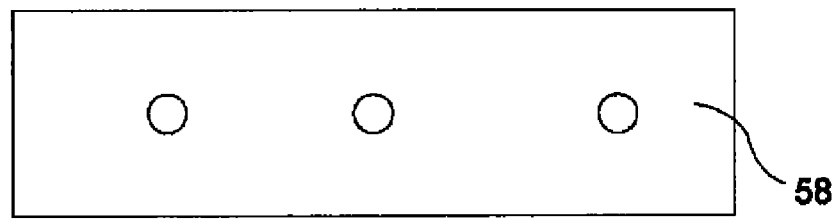
Figure 5:
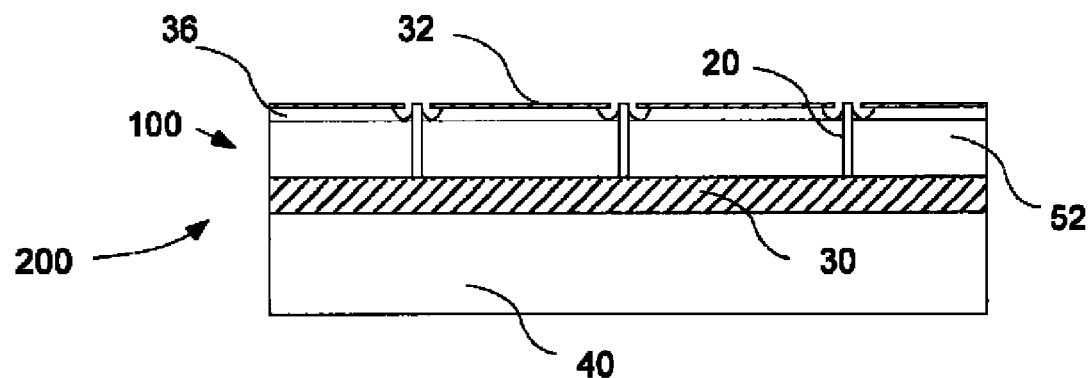

A third alternative is to coat the surface with a thick positive photo resist 58 after the deposition of the gate metal to planarize the surface, as is shown in FIG. 5A. The resist at the top of posts 56 will be substantially thinner than it is on the floor surface at the bottom of the posts. A global UV illumination 60 is then applied with a dosage chosen such that only the resist on top of the post will be dissolved after resist development, forming a mask with opening only on top of the posts, as is shown in FIG. 5B. The gate metal and insulator are then removed from the posts by chemical etches. Removal of the resist mask results in apertures in the gate metal and the insulator around each CNT.

It is obvious to the ones who are skilled in the field that the above described methods of fabricating a self-aligned and nano-sized apertures around a vertically oriented and mono-dispersed nano-structure is independent of the way how the nano-structures are introduced onto the cathode electrode. Alternatives of introducing the nano-structures onto the surface include at least: growing nano-structures using such templates as porous alumna or silica, or assembling pre-fabricated nano-structures onto the surface. In case of using a template for growth, the template itself can later serve as the embedding material.

Figure 6:
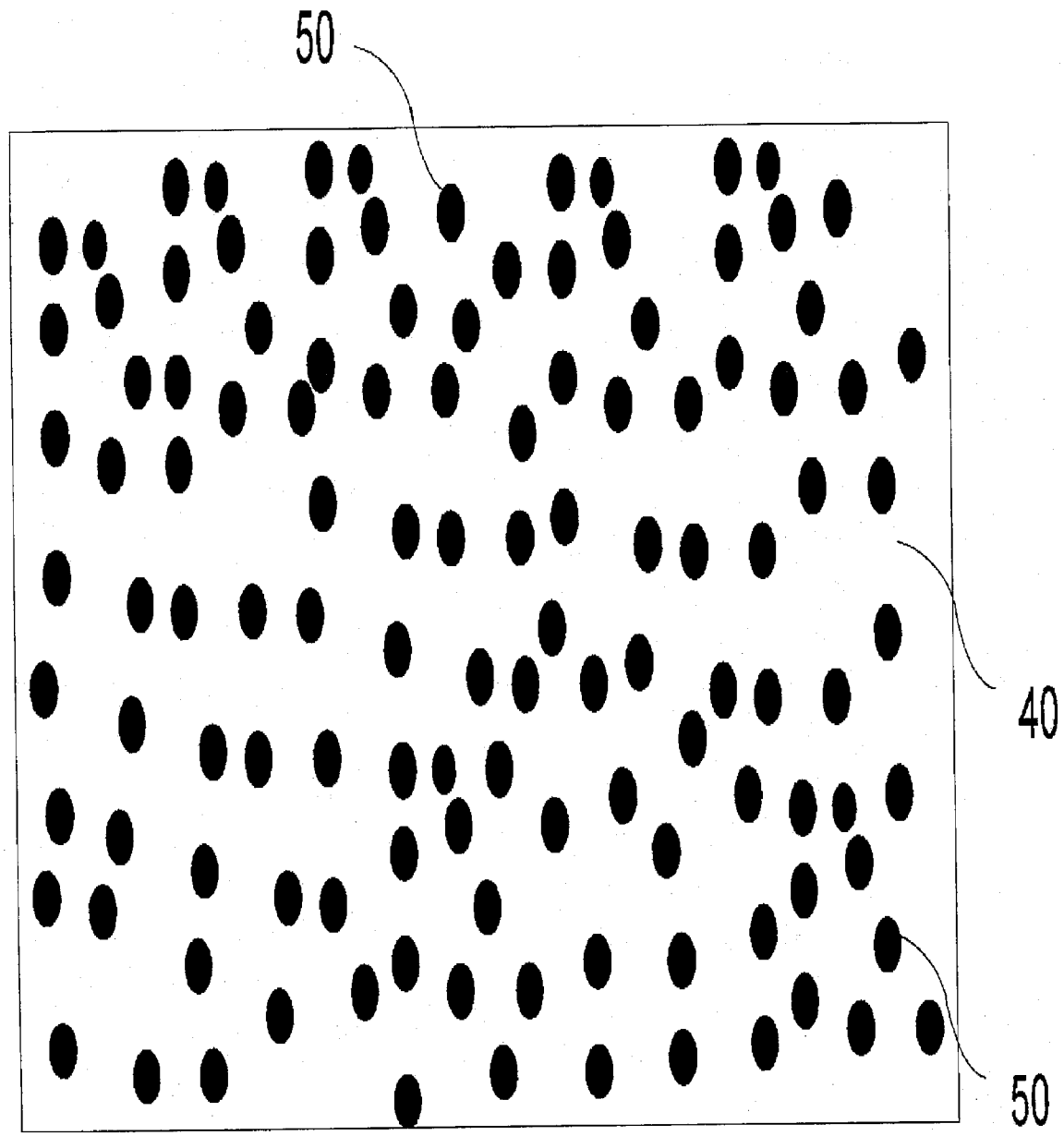
FIG. 6 shows a catalyst pattern formed using an ion-track-etched membrane as a mask.

FIG. 6 shows a pattern of catalyst dots 50 formed from a deposition through an ion-track-etched membrane. A membrane with a pore density of $10^8/cm^2$ will result in an array of CNT with an average spacing of one micrometer between them, which is sufficiently ample for a gated structure that the diameter of the aperture is only a small fraction of it. There is a wide selection range for these track-etched membranes. Depending on applications, one could choose a membrane with a pore density anywhere between $10^5/cm^2$ and $5\times10^8/cm^2$, giving rise to an average spacing between 50 micrometers to 500 nm. As for pore size, only those with pores less than 300 nm should be used since a catalyst dot size larger than 300 nm will result in multiple CNT growth. The most common track-etched membranes are those of polycarbonate or polyester. To eliminate the outgasing of these plastics in a vacuum deposition chamber, one could use a membrane from other materials such as Cu or Al thin films. Using the track etched plastic membrane as an etch mask, one can easily transfer the pores size and distribution from the plastic film to that of other materials.

Figure 7:
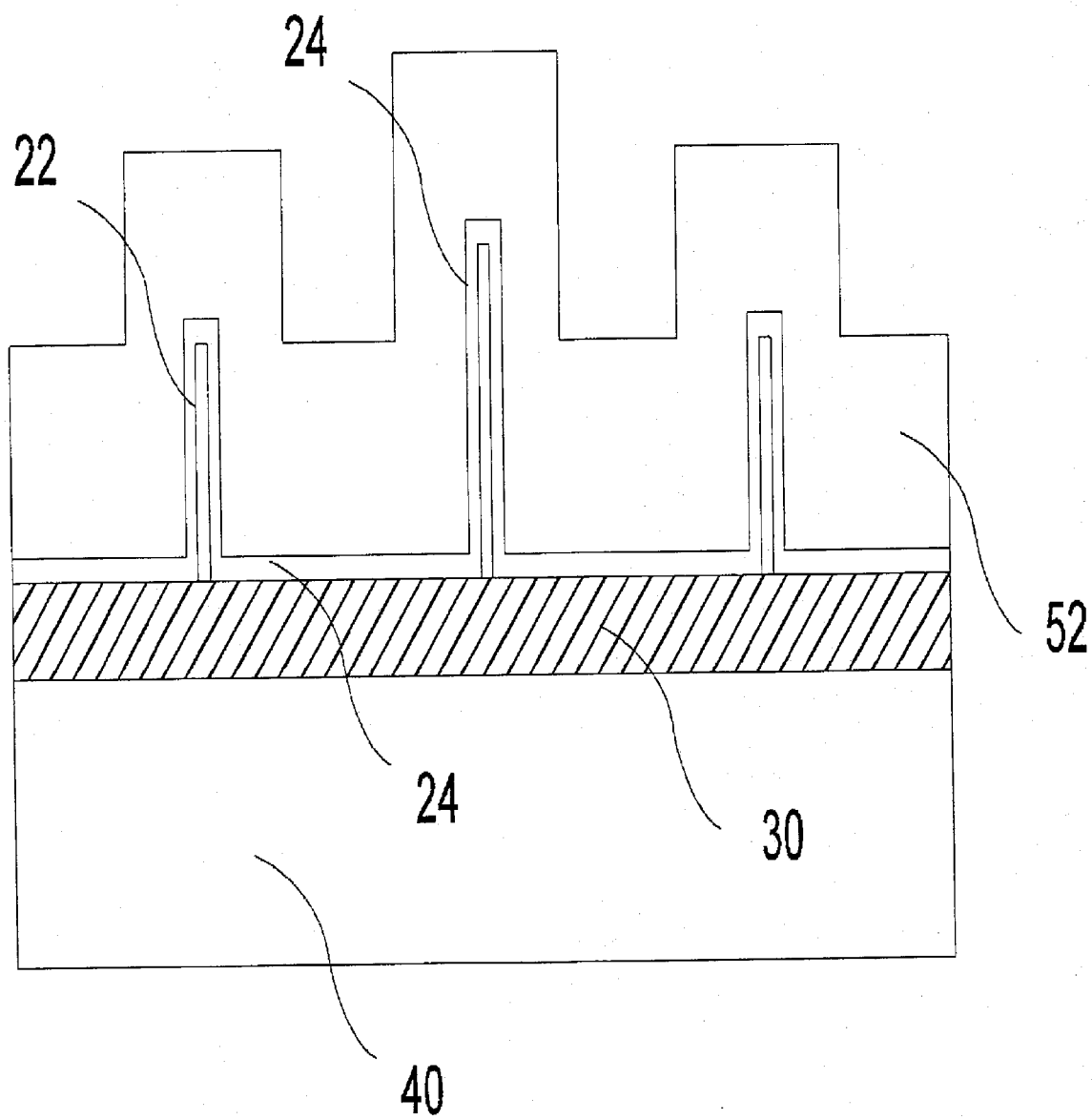
FIG. 7 shows the use of a non-conductive nano-structure as emitter and the conformal coating of a conductive layer prior to the deposition of a dielectric embedding material.

Nano-structures from many materials can be used to replace CNT in the current invention. Examples of conductive nano-structure alternatives include refractive metal or alloy nano-wires; conductive ceramics or conductive ceramic composite nano-wires; carbon fiber and carbon nano-cone; conductive nano-structures with a thin film coating for enhanced field emission, such as W nano-wire coated with nano-diamond, or diamond like carbon; and composite nano-structures with a non-conductive core and a conductive shell or vise versa. Examples of non-conductive nano-structures include: BN nanotube, nano-wires of AlN, AlGaN, GaN, SiC, ZnO and diamond. There are two ways to provide electrons transportation from the cathode to tip of the non-conductive nano-structures. FIG. 7 depicts one of them. A conductive coating 24 of a thickness of the diameter of nonconductive nano-structure 22 is applied before the deposition of an embedding dielectric. The nonconductive nano-structures are, therefore, converted to a composite with a non-conductive core and a conductive shell. Alternatively, a conductive material is used to embed the nano-structures. The most desirable conductive coating or embedding materials include conductive ceramics, conductive ceramic composites and refractive metals and alloys.

The use of different nano-structures as emitter may also require the choice of different catalyst to be used. For CNT, typical catalysts include: transition metals and their compounds, such as Ni, Co or Fe. Sometimes, a diffusion barrier, such as TiN, may have to be deposited first to prevent the catalyst from diffusing into the cathode electrode during CNT growth. For other nano-structures, one of the often-used catalysts is Au. However, selection of proper catalyst for a particular nano-structure growth should be obvious to those skilled in the field.

A ballast resist layer, such as cermet, can also be applied between the nano-structure and the cathode electrode to even out electron emission from different emitters.

Optionally, either the diffusion barrier or the ballast resistor layer can be deposited at the same time when the catalyst is deposited through the track-etched membrane.

Figure 8:
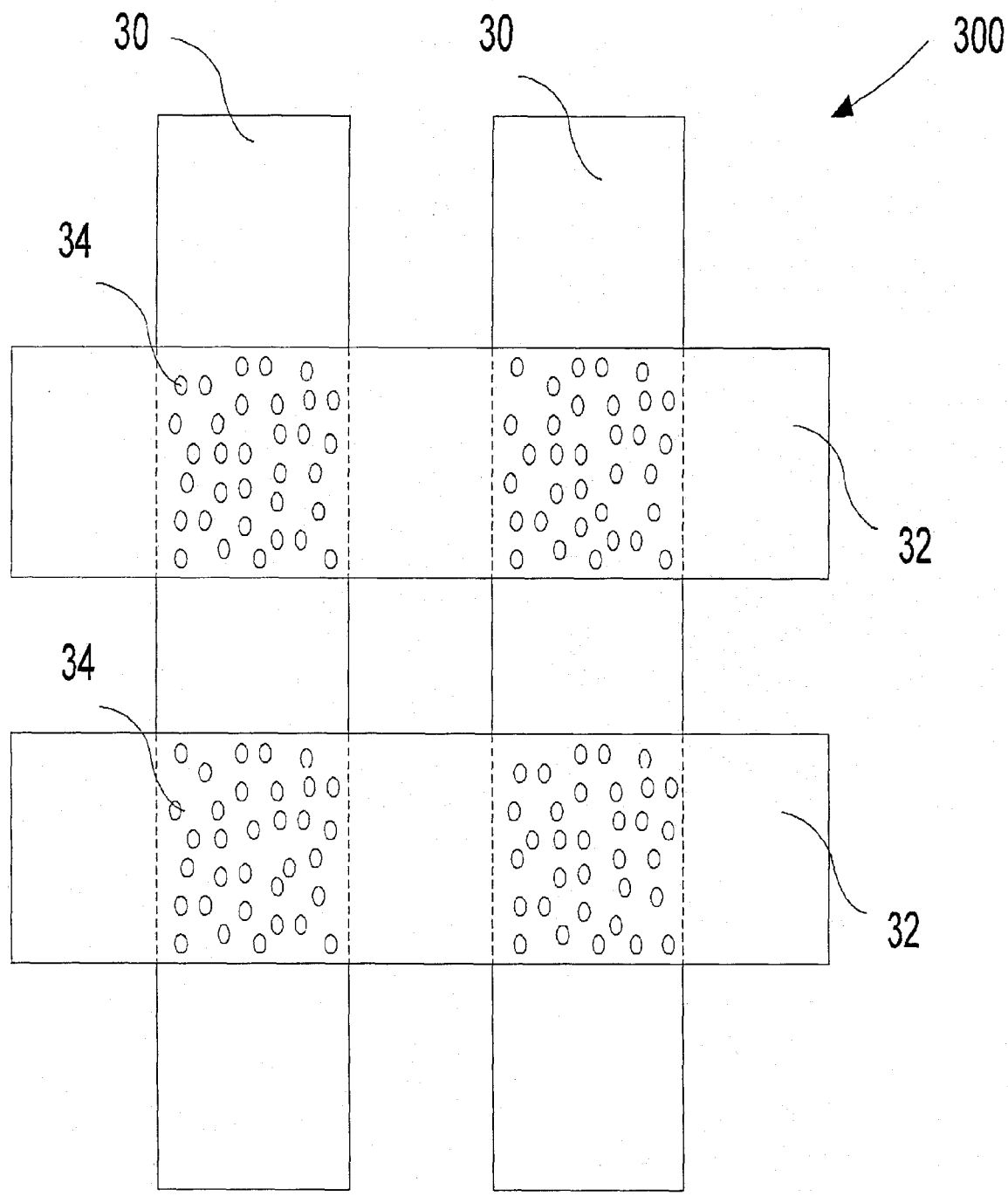
FIG. 8 shows a top view of an addressable electron source according to the current invention.

FIG. 8 schematically illustrates an addressable electron source 400 in accordance with the current invention. It includes: multiple electrically isolated cathode electrodes 30 extending on the substrate in one direction; an emitter layer disposed over the cathode electrodes and formed from an embedding material and multiple vertically aligned and mono-dispersed nano-structures embedded therein, the nano-structures are truncated to the same length, protrude above the surface of the emitter layer and are distributed in patches along the cathode electrodes, and the density of the structures in each patch is as high as $10^8/cm^2$; a gate insulator of a thickness less than 100 nm being deposed over the emitter layer and having apertures aligned with and exposes each nano-structure in the emitter layer; and multiple electrically isolated gate electrodes 32 disposed over the insulator and extending in the orthogonal direction to intersect with each cathode electrode at the location where the nano-structure patches are; and multiple apertures 34 in the gate electrodes at each intersection that are aligned with apertures in the insulator and are spaced from the exposed nano-structure by a distance equal to the thickness of the insulator. Activation of a selected cathode and a selected gate electrode determine the patch at the selected intersection, or the pixel, that emits electrons.

Figure 9:
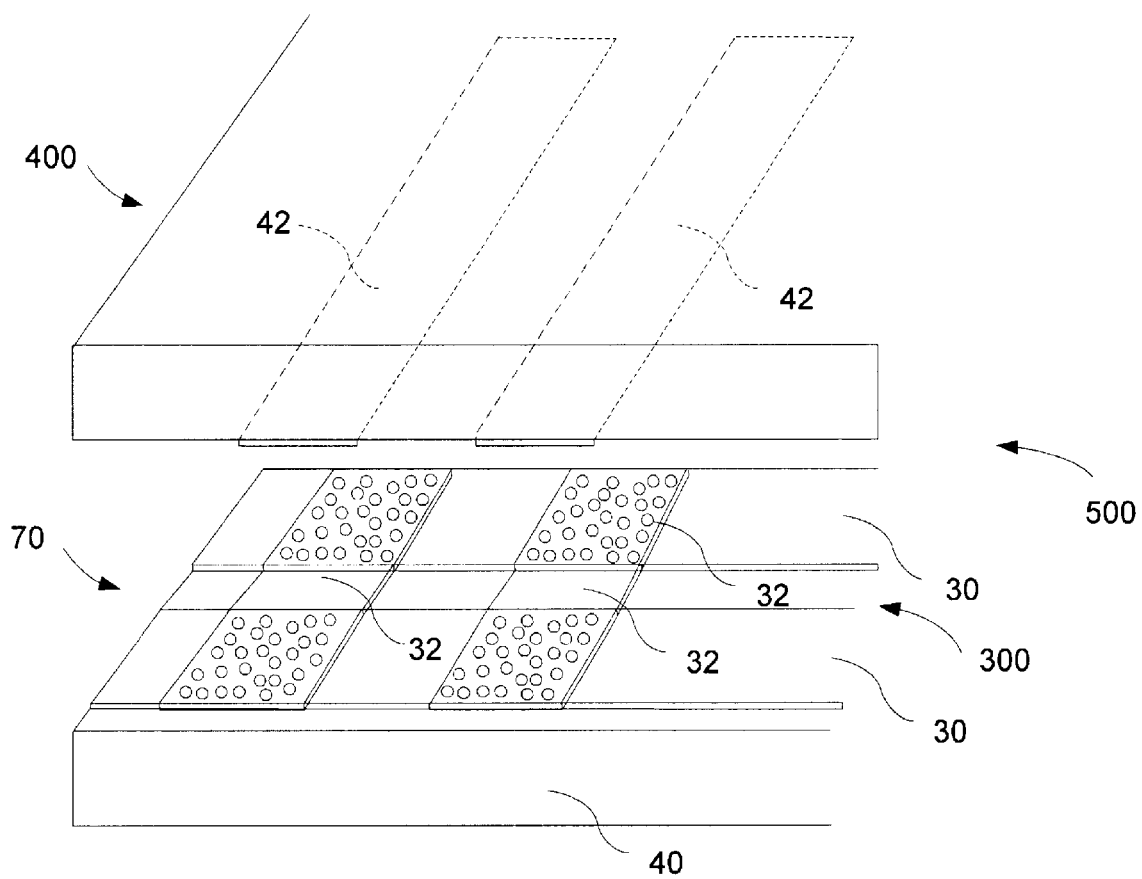
FIG. 9 shows a display according to the current invention.

FIG. 9 schematically illustrates an addressable display 500. An addressable electron source 300 on a glass substrate is positioned opposite and with a vacuum gap 70 from an anode plate 400. The anode plate consists of glass substrate, an array of transparent, parallel and electrically isolated anodes deposited on the glass and phosphor screens disposed over each anode electrode. ITO (Indium Tin Oxide) is one of the typical materials often used as a transparent electrode. The cathode electrode is configured as an array of strip-like cathode electrodes extending substantially in the same direction and to be spaced and electrically insulated from each other at intervals in the transverse direction. The nano-structures are distributed in patches along the cathodes with a density of, for instance, $10^8/cm^2$ in each patch. The gate electrode is configured as array of strip-like gate electrodes extending in the direction that intersect with the array of cathode electrodes at each patch of nano-structures and to be spaced and electrically insulated from each other at intervals in the transverse direction. Apertures are formed in the gate electrode and gate insulator, each aligned with and exposes one nano-structure in the emitter layer. The transparent anode electrode is configured as an array of strip-like anode electrodes, each extending opposed to the corresponding one of the gate electrodes. When a selected cathode and a selected gate electrode strip are activated, a selected intersection or pixel emits electrons and generates a light spot when the electrons strike the phosphor screen on the correspondingly selected anode electrode.

In both the embodiments shown in FIG. 8 and FIG. 9, the nano-structures are distributed along and over the cathode electrodes in patches. However, this is not necessary for an electron source or display to be addressable. In fact, the nano-structures can be distributed continuously either over and along the cathodes or over the entire substrate. Since only at the intersections where both cathode and gate electrodes are present, the nano-structures at other locations will not emit electrons. It should also be pointed out that when a conductive material is used to embed the nano-structures in an addressable electron source or display, care must be taken to maintain the electrical isolation between the cathodes. Using a non-conductive material to fill the space between the cathodes should solve the problem.

It is to be understood that the embodiments described above are illustrative of only a few of the many possible specific embodiments that can represent applications of the principles of the invention. Numerous and varied other arrangements can be readily devised by those skilled in the art without departing from the spirit and scope of the invention.

What is claimed is:

1. A method of fabricating an electron source having a self-aligned gate aperture, the method comprising:
   providing a substrate;
   depositing a first conductive layer;
   depositing nano-structures on the first conductive layer;
   embedding the nano-structures with an embedding material;

removing the embedding material from the top portion of the nano-structures so that part of said nano-structures protrudes above the surface of the embedding material forming an emitter layer;

conformally depositing an insulator over the emitter layer such that a post forms from each said protruding part of the nano-structure;

depositing a second conductive layer over the insulator; and removing the second conductive layer and the insulator from the nano-structures such that apertures are formed in the second conductive layer and at least the ends of the nano-structures are exposed at the centers of said apertures;

wherein removing the insulator and the second conductive layer from the nano-structures includes:

spin-coating a positive photoresist over the second conductive layer, wherein the photoresist is substantially thinner at portions over the posts than at portions between the posts;

globally exposing said photoresist with UV illumination such that, after resist development, a mask is formed with openings only on top of the posts;

etching the second conductive layer and the insulator using the mask.

2. A method as recited in claim 1, wherein the nano-structures extend substantially orthogonally from the substrate.

3. A method as recited in claim 1, wherein each of the nano-structures protrudes a particular length above the surface that is substantially the same.

4. A method as recited in claim 1, wherein a resistor layer is disposed over the first conductve layer.

5. A method as recited in claim 1, wherein removing said embedding material from the top portion of the nano-structures includes:

truncating the nano-structures to expose the tips of the nano-structures; and etching back part of the embedding material such that part of the nano-structures protrude above the surface.

6. A method as recited in claim 5, wherein truncating the nano-structures is performed by polishing.

7. A method as recited in claim 6, wherein polishing is performed by a chemical, mechanical planarization process.

8. A method as recited in claim 1, wherein depositing the nano-structures on the first conductive layer includes:

depositing one or a plurality of nano-sized and spaced-apart catalyst particles on the first conductive layer; and growing a nano-structure from each of said catalyst particles.

9. A method as recited in claim 8, wherein depositing nano-sized catalyst particles includes depositing said particles over said the substrate through a mask.

10. A method as recited in claim 9, wherein the mask includes membranes formed from ion-tracked etching.

11. A method as recited in claim 9, wherein the mask includes membranes formed from etching using an ion-track-etched membrane as a mask.

12. A method as recited in claim 8, wherein the step of growing nano-structure from each said catalyst particle includes growing a single nano-structure from each said catalyst particle.

13. A method as recited in claim 8, wherein growing the nano-structures includes growing the nano-structures from a template such that the template remains part of the embedding material.

14. A method as recited in claim 1, wherein depositing the nano-structures on the first conductive layer includes depositing the nano-structures over the first conductive layer using pre-fabricated nano-structures.

15. A method of fabricating an electron source having a self-aligned gate aperture, the method comprising:

providing a substrate;

depositing a first conductive layer;

depositing nano-structures on the first conductive layer;

embedding the nano-structures with an embedding material;

removing the embedding material from the top portion of the nano-structures so that part of said nano-structures protrudes above the surface of the embedding material forming an emitter layer;

conformally depositing an insulator over the emitter layer such that a post forms from each said protruding part of the nano-structure;

depositing a second conductive layer over the insulator; and removing the second conductive layer and the insulator from the nano-structures such that apertures are formed in the second conductive layer and at least the ends of the nano-structures are exposed at the centers of said apertures;

wherein the second conductive layer is thinner than the insulator and depositing the second conductive layer includes a line-of-sight process such that the second conductive layer is mostly deposited on the top of the posts and the surface of the insulator; and wherein removing the insulator and the second conductive layer from the nano-structures includes etching the insulator from the sides of the posts such that the second conductive layer on the top of posts is lifted off.

16. A method of fabricating a self-aligned aperture around a nano-structure, the method comprising:

providing nano-structures supported be a substrate and extending from the substrate surface;

conformally depositing a spacing layer with a pre-determined thickness over the substrate surface to form posts from protruding parts of the nano-structures;

depositing an aperture layer of a pre-determined material over said spacing layer with a pre-determined thickness; and removing the spacing layer and the aperture layer from the nano-structures such that an aperture forms around each of the nano-structures in the aperture layer and the tips of the nano-structures are exposed, wherein the apertures are formed such that the nano-structures are spaced from the aperture layer by the thickness of the spacing layer;

wherein the aperture layer is thinner than the spacing layer and depositing an aperture layer includes a line-of-sight process such that the aperture layer is mostly deposited on the top of the posts and the surface of the spacing layer; and wherein removing the spacing layer and the aperture layer from the nano-structures includes etching the spacing layer from the sides of the posts such that the aperture layer on the top of posts is lifted off.

17. A method of fabricating a self-aligned aperture around a nano-structure, the method comprising:

providing nano-structures supported by a substrate and extending from the substrate surface;

conformally depositing a spacing layer with a pre-determined thickness over the substrate surface to form posts from protruding parts of the nano-structures;

depositing an aperture layer of a pre-determined material over said spacing layer with a pre-determined thickness; and removing the spacing layer and the aperture layer from the nano-structures such that an aperture forms around each of the nano-structures in the aperture layer and the tips of the nano-structures are exposed, wherein the apertures are formed such that the nano-structures are spaced from the aperture layer by the thickness of the spacing layer;

wherein removing the spacing layer and the aperture layer from the nano-structures includes:
spin-coating a positive photoresist over the aperture layer, wherein the photoresist is substantially thinner at portions over the posts than at portions between the posts;
globally exposing said photoresist with UV illumination such that, after resist development, a mask is formed with openings only on top of the posts;
etching the aperture layer and the spacing layer using the mask.

18. A method of fabricating a self-aligned aperture around a nano-structure, the method comprising:
providing nano-structures supported by a substrate;
embedding the nano-structures with an embedding material;
removing the embedding material from the top portion of the nano-structures so that part of each of the nano-structures protrudes above the surface of the embedding material;
conformally depositing a spacing layer with a pre-determined thickness over the surface to form posts from said protruding parts of the nano-structures;
depositing an aperture layer of a pre-determined material over said spacing layer with a pre-determined thickness; and
removing the spacing layer and the aperture layer from the nano-structures such that an aperture forms around each of the nano-structures in the aperture layer and the tips of the nano-structures are exposed, wherein the apertures are formed such that the nano-structures are spaced from the aperture layer by the thickness of the spacing layer;
wherein removing the spacing layer and the aperture layer from the nano-structures includes:
spin-coating a positive photoresist over the aperture layer, wherein the photoresist is substantially thinner at portions over the posts than at portions between the posts;
globally exposing said photoresist with UV illumination such that, after resist development, a mask is formed with openings only on top of the posts;
etching the aperture layer and the spacing layer using the mask.

19. A method as recited in claim 18, wherein the spacing layer is an insulator, and the aperture layer is electrically conductive so that an electrical field can be applied to the nano-structures through the formed aperture.

20. A method as recited in claim 18, wherein the diameter of the aperture is substantially less than one micrometer.

21. A method as recited in claim 18,
wherein each of the nano-structures is an electron emitter; and
wherein the aperture is a gate electrode for controlling electron emission from the emitter.

22. A method as recited in claim 18, wherein removing the embedding material from the top portion of the nano-structures includes:

truncating the nano-structures along a surface to expose the tip of the nano-structures; and
etching back part of the embedding material such that part of each of the nano-structures protrudes above the surface.

23. A method as recited in claim 22, wherein truncating the nano-structure includes polishing.

24. A method of fabricating an electron source having a self-aligned gate aperture, the method comprising:
providing a conductive substrate that acts as a first conductive layer;
depositing nano-structures on the first conductive layer;
embedding the nano-structures with an embedding material;
removing the embedding material from the top portion of the nano-structures so that part of said nano-structures protrudes above the surface of the embedding material forming an emitter layer;
conformally depositing an insulator over the emitter layer such that a post forms from each said protruding part of the nano-structure;
depositing a second conductive layer over the insulator; and
removing the second conductive layer and the insulator from the nano-structures such that apertures are formed in the second conductive layer and at least the ends of the nano-structures are exposed at the centers of said apertures;
wherein removing the insulator and the second conductive layer from the nano-structures includes:
spin-coating a positive photoresist over the second conductive layer, wherein the photoresist is substantially thinner at portions over the posts than at portions between the posts;
globally exposing said photoresist with UV illumination such that, after resist development, a mask is formed with openings only on top of the posts;
etching the second conductive layer and the insulator using the mask.

25. A method of fabricating a self-aligned aperture around a nano-structure, the method comprising:
providing nano-structures supported by a substrate;
embedding the nano-structures with an embedding material;
removing the embedding material from the top portion of the nano-structures so that part of each of the nano-structures protrudes above the surface of the embedding material;
conformally depositing a spacing layer with a pre-determined thickness over the surface to form posts from said protruding parts of the nano-structures;
depositing an aperture layer of a pre-determined material over said spacing layer with a pre-determined thickness; and
removing the spacing layer and the aperture layer from the nano-structures such that an aperture forms around each of the nano-structures in the aperture layer and the tips of the nano-structures are exposed, wherein the apertures are formed such that the nano-structures are spaced from the aperture layer by the thickness of the spacing layer;
wherein the aperture layer is thinner than the spacing layer and deposited by a line-of-sight process such that it is mostly deposited on the top of the posts and the surface of the spacing layer; and
wherein removing the spacing layer and the aperture layer from the nano-structures includes etching the spacing layer from the side of the posts such that the aperture layer on the top of posts are lifted off.

26. A method of fabricating an electron source having a self-aligned gate aperture, the method comprising:
   providing a conductive substrate that acts as a first conductive layer;
   depositing nano-structures on the first conductive layer;
   embedding the nano-structures with an embedding material;
   removing the embedding material from the top portion of the nano-structures so that part of said nano-structures protrude above the surface of the embedding material forming an emitter layer;
   conformally depositing an insulator over the emitter layer such that a post forms from each said protruding part of the nano-structure;
   depositing a second conductive layer over the insulator; and
   removing the second conductive layer and the insulator from the nano-structures such that apertures are formed in the second conductive layer and at least the ends of the nano-structures are exposed at the centers of said apertures;
   wherein the second conductive layer is thinner than the insulator and deposited by a line-of-sight process such that it is mostly deposited on the top of the posts and the surface of the insulator; and
   wherein removing the insulator and the second conductive layer from the nano-structures includes etching the insulator from the side of the posts such that the second conductor on the top of posts are lifted off.

* * * * *